(12) United States Patent
Lim et al.

(10) Patent No.: US 6,374,296 B1
(45) Date of Patent: Apr. 16, 2002

(54) METHOD AND SYSTEM FOR PROVIDING CROSS-PLATFORM REMOTE CONTROL AND MONITORING OF FACILITY ACCESS CONTROLLER

(75) Inventors: Hoon Chiat Lim; Seng Chong Sing; Kian Giap Lim; Yong Huat Sim, all of Singapore (SG)

(73) Assignee: ADC Technologies International Pte Ltd, Singapore (SG)

( * ) Notice: Subject to any disclaimer, the term of this patent is extended or adjusted under 35 U.S.C. 154(b) by 0 days.

(21) Appl. No.: 09/199,429

(22) Filed: Nov. 25, 1998

(51) Int. Cl.[7] .............................................. G06F 15/16
(52) U.S. Cl. ...................................... 709/225; 709/229
(58) Field of Search ................................ 709/224, 229, 709/220, 200, 218, 203, 222, 225; 710/11; 707/203; 713/324

(56) References Cited

U.S. PATENT DOCUMENTS

| | | | |
|---|---|---|---|
| 5,805,442 A | | 9/1998 | Crater et al. |
| 5,974,441 A | * | 10/1999 | Rogers et al. ............... 709/200 |
| 6,148,336 A | * | 11/2000 | Thomas et al. .............. 709/224 |
| 6,151,625 A | * | 11/2000 | Swales et al. ............... 709/218 |
| 6,151,640 A | * | 11/2000 | Buda et al. ..................... 710/11 |
| 6,157,943 A | * | 12/2000 | Meyer .......................... 709/203 |
| 6,173,326 B1 | * | 1/2001 | Collins ......................... 709/229 |
| 6,195,694 B1 | * | 2/2001 | Chen et al. .................. 709/220 |

* cited by examiner

Primary Examiner—Zarni Maung
Assistant Examiner—Jungwon Chang

(57) ABSTRACT

A method and system for providing cross-platform remote control and monitoring of a facility electronic access controller includes a CPU, a non-volatile memory, at least one of a network port and a cross-platform port, and an input/output interface. The system includes an input access control device operatively linked to the interface. The input access control device generates identification data of a user. The system also has an output access control device operatively linked to the interface. The system also includes a cross-platform network and a remote computer operatively linked to the facility access controller by the cross-platform network, whereby the cross-platform network enables remote operation of the facility electronic access controller irrespective of compatibility between an operating system of the remote computer and the operating system of said facility access controller.

18 Claims, 3 Drawing Sheets

METHOD AND SYSTEM FOR PROVIDING CROSS-PLATFORM REMOTE CONTROL AND MONITORING OF FACILITY ACCESS CONTROLLER

BACKGROUND OF THE INVENTION

1. Field of the Invention

The present invention relates to a method and system for providing cross-platform remote control and monitoring of a facility access controller. The monitoring of the facility access controller includes detecting the status or monitoring of alarms operatively linked to a facility. The method and system employ a facility electronic access controller which is operatively linked to the world wide web. The method and system enable data transfer between facility electronic access controllers having different operating systems. The method and system also permit monitoring and control of the facility electronic access controllers by remote sites that employ web browsers to access web servers of the facility electronic access controllers.

2. Description of the Background Art

Facility electronic access controllers that are used for controlling and monitoring physical access of buildings, rooms, and restricted areas typically employ some form of identification means to verify the identity of a person before such person can pass through the controlled or restricted area. The identification means typically includes a coded card or other type of data bearing record which employs a specific coding to identify the user. Many facility electronic access controllers are designed to have built-in electronic processing intelligence, having the ability to store unique identified codes in digital form, and to determine who are allowed or not permitted to gain access to a controlled or restricted area.

Such facility electronic access controllers (FEACs) can be connected to one or more central computers where a set of application specific programs are installed. The FEAC and the central computers are linked via communication interfaces and communicate/interact through specific and predetermined protocols. Typically, a set of programs are installed on each central computer and are designed for a specific operating system platform to monitor transactions uploaded from a FEAC and also permit downloads of data to a FEAC. Typically, a central computer will control several FEAC of one building.

FEACs are typically used for monitoring of intrusion alarms within a building, or part of a building, rooms, restricted areas, etc. When an alarm is activated, the FEAC will generate audible and visual indicators locally within a building. In response to these indicators, a security guard who supervises the facility will take the appropriate action. If a facility or a building is not manned by a guard, the alarm signals will be transmitted automatically to a central PC. Alarm signals may also be transmitted a third party central alarm monitoring station, via an appropriate interface.

With the conventional art, installing application programs on each and every central computer of multiple buildings which can be networked together to allow users to operate one or many functions through the networked central computers is very difficult. Frequently, central computers of different buildings will also have different and incompatible operating systems. In the situation where one or more buildings having a plurality of central computers are networked together, any changes in the application programs or operating systems of each central computer would require changes to be made to each central computer individually so that the changes would be implemented to the entire network of central computers. Furthermore, the conventional art does not permit interaction between software of central computers which support different foreign languages due to different versions of operating systems on each central computer.

Accordingly, a need in the art exists for a method and system for providing cross-platform remote control and monitoring of facility electronic access controllers that have different operating systems. A further need exists in the art for a method and system for providing cross-platform remote control and monitoring of facility electronic access controllers (FEACs) which allows a single change or multiple changes in at least one of entry codes to the facility and operating parameters to be implemented into individual operating systems of central computers of facility electronic access controllers simultaneously.

SUMMARY OF THE INVENTION

Accordingly, it is a primary object of the present invention to provide a method and system for providing cross-platform remote control and monitoring of facility electronic access controllers. It is a further object of the present invention to provide a method and system for implementing changes with respect to facility access data and control for multiple central computers of facility electronic access controllers which may or may not have similar operating systems.

An additional object of the present invention is to provide a method and system for providing cross-platform remote control and monitoring of facility access controllers where the central computer of each facility electronic access controller includes a web server.

Another object of the present invention is to provide a method and system for providing cross-platform remote control and monitoring of facility electronic access controllers where each central computer of a facility electronic access controller can communicate with clients via industrial protocol using transmission control protocol over internet protocol (TCP/IP) and hypertext transfer protocol (HTTP).

A further object of the present invention is to provide a method and system for providing cross-platform remote control and monitoring of facility electronic access controllers where clients of the facility electronic access controllers employ any type of web browser program to access the FEAC while remote computers or remote central computers of a FEAC are able to monitor transaction activities of a restricted area from and within the web server and/or the FEAC. A client as used herein is defined as a computer system or process that requests a service of another computer system or process such as a server. A server is a program which provides some service to other (client) programs. The connection between client and server is normally by means of message passing, often over a network, and uses some protocol to encode the client's requests and the server's responses. A server may run continuously (as a daemon), waiting for requests to arrive or it may be invoked by some higher level daemon which controls a number of specific servers ("inet-ed" on Unix). There are many servers associated with the Internet, such as those for Network File System, Network Information Service (NIS), Domain Name System (DNS), FTP, news, finger, Network Time Protocol.

An additional object of the present invention is to provide a method and system for providing cross-platform remote control and monitoring of facility access controllers where different central computers of FEACs running on different operating systems but which are connected in the same network (whether within a local area network or wide area network) to communicate with different central computers of FEAC.

A further object of the present invention is provide a method and system for providing cross-platform remote control and monitoring of facility electronic access controllers where web servers of facility electronic access controllers are designed using hypertext markup language (HTML) standards that support different languages.

Another object of the present invention is to provide a method and system for providing cross-platform remote control and monitoring of facility electronic access controllers where central computers of a FEAC act as simple mail transfer protocol (SMTP) clients, allowing the central computer of a FEAC to send data, log, normal activity transactions, or security breach data, etc., to a remote user via the internet E-mail protocol. With such a method and system, specific or selected information can be transmitted by a computer of a FEAC based on program control. Further, with such a method and system, specific or selected access information or data can be sent to multiple users at multiple locations via an internet E-mail system.

It is a further object of the present invention to provide a method and system for providing cross-platform remote control and monitoring of facility access controllers where central computers running on different operating systems of FEAC can retrieve/access information or data with standard E-mail software.

A further object of the present invention is to provide a method and system for providing cross-platform remote control and monitoring of facility electronic access controllers where installation of identical software at each central computer of each FEAC is substantially eliminated. In other words, it is an object of the present invention to provide a method and system for providing cross-platform remote control and monitoring of facility electronic access controllers where the central computers of each FEAC may employ a different operating system with respect to a neighboring central computer of a neighboring FEAC and control can be achieved by a remote computer with a web browser program.

An additional object of the present invention is to provide a method and system for providing cross-platform remote control and monitoring of facility intrusion alarm monitoring functions, whereby the same remote computer or computers acting as web clients can monitor alarms which detect facility or building penetration conditions via the internet.

An additional object of the present invention is to provide a method and system for providing cross-platform remote control and monitoring of facility electronic access controllers where access data of the monitoring of restricted areas is provided to a remote computer or a central computer of a FEAC in real time. Such access data of restricted areas can include, but is not limited to, displaying cardholder identified codes, results of biometric scans, device names, location descriptions, and system database and FEAC in real time. Other access data includes displaying graphical images and dynamic status information on web pages and retrieving such information with web browsers of a remote computer or a central computer of a FEAC.

These and other objects of the present invention are fulfilled by providing a method for providing cross-platform remote control and monitoring of a facility electronic access controller, the method comprising the steps of: monitoring an input access control device with the facility electronic access controller; receiving first identification data with the facility electronic access controller from an input access control device; comparing second identification data stored in the facility input access controller with the first identification data; activating an output access control device of the facility electronic access controller if the first identification data matches the second identification data; generating at least one of time data and location data with the facility access controller in response to the first identification data; and transferring the first identification data and at least one of the time data and the location data with the facility electronic access controller over a cross-platform network to a remote computer.

In addition, these and other objects of the present invention are also accomplished by a system for providing cross-platform remote control and monitoring of a facility electronic access controller, the system comprising: a facility electronic access controller including: a CPU; a non-volatile memory; at least one of a network port and a cross-platform port; an input/output interface; an input access control device operatively linked to the interface, the input access control device generating identification data of a user; an output access control device operatively linked to the interface; a cross-platform network; and a remote computer operatively linked to the facility access controller by the cross-platform network, whereby the cross-platform network enables remote operation of the facility electronic access controller irrespective of compatibility between an operating system of the remote computer and an operating system of the facility access controller.

Additionally, these and other objects of the present invention are also accomplished by A computer program product for providing cross-platform remote control and monitoring of a facility electronic access controller, the computer program product comprising: a computer useable medium having computer readable code embodied therein, the computer readable code including a controller operating system computer readable program code device, the controller operating system computer program code device further includes: an access control system computer readable program code module which monitors output and input access control data of a facility; a TCP/IP computer readable program code module; and at least one of an internet server computer readable program code module and a mail client computer readable program module, whereby the controller operating system computer readable program code device enables remote operation of the facility electronic access controller irrespective of compatibility between an operating system of a remote computer and the controller operating system computer readable code device of the facility access controller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
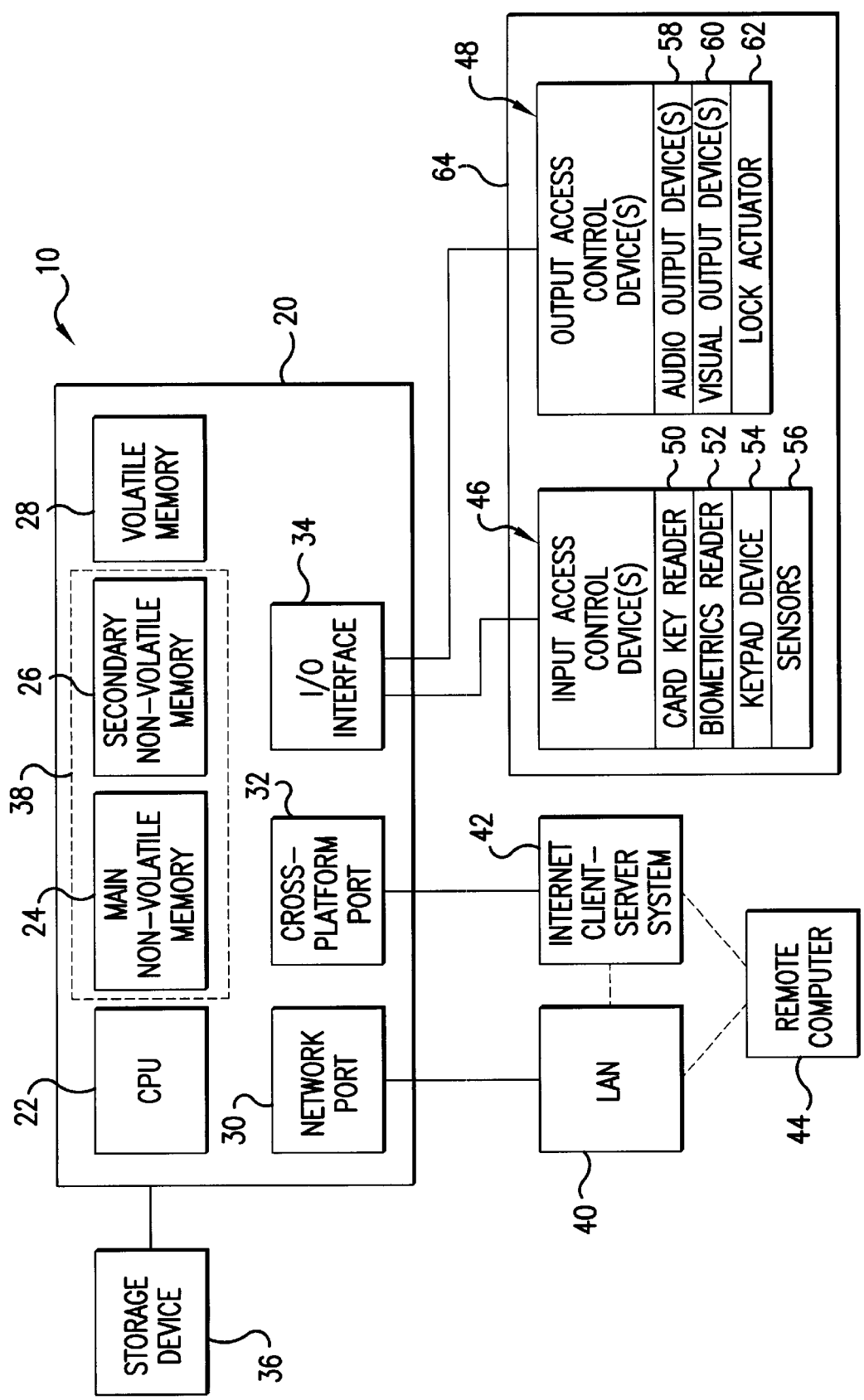
FIG. 1 illustrates a block diagram of a system for providing cross-platform remote control and monitoring of a facility electronic access controller.

Referring in detail to the drawings and with particular reference to FIG. 1, a system 10 for providing cross-platform remote control and monitoring of a facility electronic access controller 20 is shown. The facility electronic access controller (FEAC) preferably includes a central processing unit 22 which is operatively linked to a main non-volatile memory 24 and a secondary non-volatile memory 26. CPU 22 is further operatively linked to a volatile memory 28, network port 30, cross-platform port 32, and input/output (I/O) interface 34. The CPU 22 is further operatively linked to a storage device 36.

The main non-volatile memory 24 is preferably at least one of an erasable programmable read-only memory (EPROM), an electrically erasable read-only memory (EEPROM), and a flash type memory. The main non-volatile memory is designed to store the operating system (OS) and application codes for the facility electronic access controller 20.

The secondary non-volatile memory 26 is preferably at least one of an electrically erasable programmable read-only memory (EEPROM) and a flash type memory. The secondary non-volatile memory 26 is designed to store web pages. It is noted that the secondary non-volatile memory 26 and the main non-volatile memory 24 can be employed on the same memory chip as indicated by reference numeral 38 if an electrically erasable non-volatile memory is employed. The volatile memory 28 is preferably random access memory (RAM). Volatile memory 28 is the memory that the CPU 22 uses for most of its operations which include tracking data from the I/O interface 34 and providing the general system working area for the FEAC 20.

Network port 30 is preferably an Ethernet™ (standardized access method for local area network) network port which employs at least one of an unshielded twisted pair (UTP) or coaxial cable to connect to a local area network (LAN) 40. UTP typically includes wires which are used for computer-to-computer communications such as for an Ethernet™ (standardized access method for local area network) that utilizes cable. Ethernet™ is defined as a coaxial cable local area network where data is broken into packets which are using the carrier sense multiple access/collision direct (CSMA/CD) algorithm until the data packets arrive at the destination without colliding with any other. Coaxial cable for local area networks is typically 50 ohm coaxial cable with multiple shielding.

The cross-platform port 32 is preferably universal asynchronous receiver/transmitter (UART) serial port. A UART is an integrated circuit used for serial communications, containing a transmitter (parallel-to-serial converter) and a receiver (serial-to-parallel converter), where the transmitter and receiver are clocked separately. The cross-platform port 32 and network port 30 are not limited to Ethernet™ (standardized access method for local area network) network ports and UART serial ports. Other type of interfaces which can be supported include, but are not limited to, fiber optics, wireless LAN, parallel ports, ATM (asynchronous transfer mode which is a method for dynamic allocation of bandwidth using fix-size packets known as cells).

The network port 30 and cross-platform port are designed to support transmission control protocol over internet protocol (TCP/IP). TCP and IP specify two protocols at specific layers, where TCP/IP is often used to refer to the entire ISO protocol suite based upon these protocols, including Telnet, FTP, UDP, RDP, HTTP, SMTP, and POP3.

Specifically, the network port 30 and cross-platform port 32 are designed to be operatively linked to an on-line service (not shown) that permits access to the internet client-server distributed information retrieval system or worldwide web (WWW) 42. As illustrated in FIG. 1, FEAC 20 is operatively linked either via cross-platform port 32—online service (server not shown)—internet client service system 42 or via network port 30—LAN 40—internet client server system 42.

Being operatively linked to the internet client server system 42, FEAC 20 can be remotely monitored and controlled by a remote control or terminal 44 which can be operatively linked to at least one of the LAN 40 or internet client server system 42 (via an online service or server not shown). Remote computer 44 can monitor or control FEAC 20 from any geographical location as long as the remote computer 44 is operatively linked to the LAN 40 or internet client server system 42. The present invention is preferably designed where the remote computer 44 interacts with FEAC 20 by a web browser which employs both the JAVA™ (object oriented programming language) and hypertext markup language (HTML) type languages. However, the present invention is not limited to these types of languages and can include other languages which permit cross-platform operation over the internet or worldwide web. Other languages include, but are not limited to, JAVA™ script, JAVA BEANS, extensible markup language (XML), standardized generalized markup language (SGML), HTML programs which include JAVA APPLETS, virtual reality modeling language (VRML), and other like object oriented programming languages.

The present invention is designed for object-oriented languages that will permit remote control and monitoring of FEAC from any platform. An object-oriented language is defined as a method of software development that groups related functions and data into reusable chunks. When properly handled, object-oriented programming can reduce development time on new projects or changes within the programs that operate within FEAC 20.

The input/out (I/O) interface is operatively linked to input access control devices 46 and output access control devices 48. The preferred input access control device is a card key reader 50. The card key reader 50 can employ various hardware structures depending on the type of card key used with the FEAC 20. Types of card keys which permit access to facilities controlled by FEAC 20 include, but are not limited to, mag-stripe cards, bar-coded cards, integrated circuits (IC) circuit cards (smart cards), radio frequency (RF) cards, biometric cards, infrared type scanning cards, and other like data bearing records. The present invention is not limited to card keys which employ only one of the above-mentioned card types and therefore can include any combinations thereof. For example, card keys can employ mag-stripes as well as biometric identification indicators present on the card which are scanned by the card key reader 50.

The present invention is not limited to card key type input access control devices 46. Other types of input access control devices 46 include, but are not limited to, biometric readers (such a retina-eye scans, skin prints, DNA scan, voice identification, weight, and combinations thereof etc.), key pad devices 54 (which include a key pad to enter a predetermined code set), and other like reading devices which require identification of a user before permitting access to a facility. The input access control devices can further include sensors 56 which detect the physical location of a user and/or the opening and closing of facility access doors. Typical sensors include, but are not limited to, infrared sensors and other heat sensors, weight sensors, magnetic read switches, video cameras (such as digital cameras which can be operatively linked to the internet client-server system 42); microphones, and other like sensing devices which detect the presence of living organisms. The input access control devices 46 may also include computers employed with digital video cameras so that visual and audio recognition can be recognized by FEAC 20.

The output access control devices preferably include, but are not limited to, audio output devices 58 and visual output devices 60. Preferred audio output devices 58 include, but are not limited to, speakers, sirens, and other types of alarms which are audible to living organisms. Visual output devices 60 include, but are not limited to, strobe lights, colored lights, video monitors, and other like video output devices which are perceptible by living organisms, such as humans.

The output access control devices 48 preferably include lock actuators 62 which permit entry into a restricted area. Typical lock actuators include, but are not limited to, magnetic locks, electrically actuated deadbolts, hydraulic actuated locks, pneumatic actuated locks and other like lock actuators which permit opening of a door or opening of an aperture which leads to an enclosed space or restricted area.

The input and output access control devices 46 and 48 can employ single devices or units and do not have to include a plurality of devices. In other words, input access control devices 46 can be just a card key reader 50 without employing sensors 56. Further, output access control device 48 can include just one lock actuator without having audio output devices 58 or visual output devices 60. Input access control devices 46 and output access control devices 48 form a subsystem 64 of FEAC 20 which is operatively linked to I/O interface 34 of FEAC 20. The present invention is not limited to one FEAC subsystem 64 and can include multiple subsystems 64 which control access to various parts of restricted areas. Preferably, FEAC subsystem 64 will provide access to various rooms within a building which is monitored by a single FEAC 20.

Storage device 36 is preferably backup non-volatile memory for the main non-volatile memory 24 and secondary non-volatile memory 26 of FEAC 20. Storage device 36 is preferably a tape or disk magnetic storage device which backups the data stored on the main non-volatile memory 24 and secondary non-volatile memory 26. The storage device 36 is designed to backup the transactional data generated by the input access control and output access control devices 46 and 48. Specifically, storage device 36 is designed to be a secondary or backup memory device for storing hourly/daily alarm reports and/or hourly/daily transaction reports of organisms entering and exiting the facility controlled by FEAC 20. Storage device 36, are not limited to erasable programmable read only memory (EPROM), EEPROMs, bubble memory, flash erasable programmable read only memory (FEROM) and other ferroelectric technologies. Other types of storage devices include, but are not limited to CD ROM, tape and disk magnetic storage.

Figure 2:
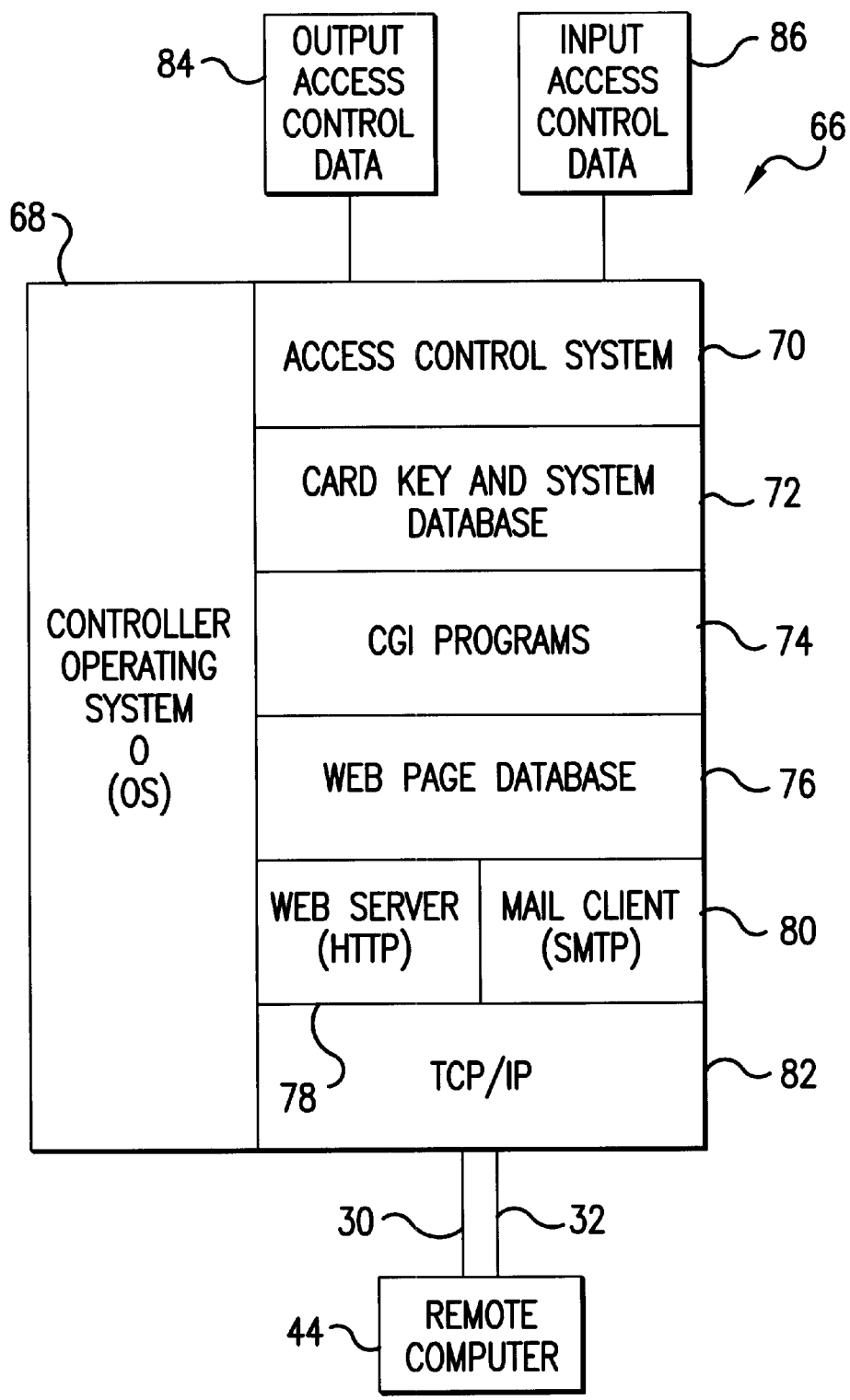
FIG. 2 illustrates a block diagram of the software modules which support a system for providing cross-platform remote control and monitoring of a facility electronic access controller.

FIG. 2 illustrates the software structure 66 which is operable within the facility electronic access controller 20. The facility electronic access controller 20 preferably includes an operating system 68 which monitors several software modules which include an access control system module 70, a card key and system database module 72, common gateway interface (CGI) program modules 74, a web page database module 76, a web server module 78, a mail client module 80 and a module which employs transmission control protocol over internet protocol (TCP/IP). The software structure 66 of FEAC 20 interacts and exchanges data with the input and output access control devices 46 and 48 via output access control data 84 and input access control data 86. The operating system 68 is designed to permit data exchange with a remote computer via network port 30 and/or a cross-platform port 32.

The operating system for the facility electronic access controller 20 monitors all of the modules to ensure that they are running concurrently. When a remote computer 44 or LAN 40 requests information through the web server 78 or E-mail client 80, the operating system does not stop the access control system module 70 from monitoring and processing output access control data 84 and input access control 86 from input access control and output access control devices 46 and 48. The operating system 68 manages all of the memory needs of the program modules in addition to all of the input/output (I/O) access control devices 46 and 48. The operating system 68 manages all of the output access control data 84 and input access control data 86 in addition to managing all of the micro processor processing time slots.

Microprocessor time slot is defined as a fix time period (normally sub-seconds) to allow a program to execute. When more than one program is executed, the operating system will break a second time period into multiple time slots and allocate each program to a specific time slot. This process is typically repeated for every clocked second. This allows the operating system to execute multiple programs at the same time.

The control or operating system 68 is preferably programmed in C language. However, other programming languages are not beyond the scope of the present invention. Other programming languages include, but are not limited to, C++, Delphi, JAVA™, and JavaScript™, Pascal, Perl, visual basic, Ada, and Eiffel.

The access control system module 70 monitors the status of any sensors 56 in real time. Basically, the access control system module 70 manages and controls all I/O functions and output access control data 84 and input access control data 86 in real time. The access control system module 70 permits access within restricted areas based on the operational parameters of at least one of the card key reader 50, biometrics reader 52, and key pad device 54. Identification information for users of the FEAC 20 are stored in digital form in the card key and system database 72. The access control system 70 logs all transactions and events of the FEAC subsystem 64 with date and time stamps. The access control system 70 is able to change alarm monitoring and access control behaviors depending upon time based events if desired. The access control system 70 permits CGI programs of CGI programs module 74 to change the access control program parameters through the card key and system database 72.

The common gateway interface (CGI) module 74 provides a standard interface for data flow between the web server program module 78 and the card key and system database program module 72. The CGI program module 74 specifies how to pass arguments to the executing program as part of HTTP request. Typically the CGI program module 74 will generate some HTML which will be passed back to a browser of a remote computer 44 but it can also request uniform resource locator (URL) redirection. The CGI program module 74 allows returned HTML (or other document types) to depend on any arbitrary way on a request. The CGI program module 74 of the present invention can be any program which can accept command line arguments.

In the preferred embodiment, the CGI program module 74 includes a set of programs that will be executed depending on the web server request from a remote computer 44. The CGI programs and the CGI program module 74 of the present invention are typically employed to obtain data from a web page and stored into the card key and system database program module 72. Typically such a data transaction includes adding a new user's card information, deleting identification codes from the database, etc., etc.

The CGI program module 74 creates web pages dynamically upon changes in operational behavior of the controller, or upon receipt of a user's request from a remote computer 44. Such web pages can display transaction activities or status of the input and output access control devices 46 and 48. Specifically, the web page is created by the CGI program interface and can display alarm occurrences along with time/date stamps.

Since the access control system module 70 runs in real time, the CGI program module 74 can generate web pages which have dynamic updates of graphical images which show the locations of users that are within a facility controlled by FEAC 20. The web page generated by CGI program module 74 can include icons and status information as to the relative location, dates and times of entry of users within the facility managed by the FEAC 20. The CGI program module 74 further verifies and checks web logon and access rights to FEAC 20.

The card key and system database module 72 includes a user's identification as well as a user's access history. The card key and system database module 72 is a set of database files that contain all of the information needed by the access control and alarm monitoring program 70 to operate. The card key and system database module 72 may include, but is not limited to, user and card key information, access rights, access time zones, transaction records, holiday dates, and other operating system parameters.

The web server program module 78 is designed to generate and serve web pages that include information which is stored in the card key and system database module 72. The web server program module 78 employs hypertext transfer protocol (HTTP) which is the client-server TCP/IP protocol used on the world wide web (WWW) for the exchange of HTML documents. The web server program module 78 is preferably based on the Internet standard RFC 1945—Hypertext Transfer Protocol—HTTP/1.0 and RFC 2068—Hypertext Transfer Protocol—HTTP/1.1. The web server program module 78 will typically perform at least one of the following functions in response to URL information: retrieve a web page; execute a CGI program; or retrieve data from the client PC. The web server program module 78 is not limited to these functions and can perform any necessary "server" type functions which improve FEAC performance. A CGI program that is executed with web server program module 78 will pass a result through the web server program module 78 to reach a client PC or remote computer 44.

The web page database program module 76 provides services and functions such as permitting logging into the access control system program module 70 and displaying past transactions and current transactions present in the card key and system database module 72. The web page database module 76 permits appending, updating, and deleting cardholder identification codes, device names, and location descriptions within the card key and system database 72 in real time. The web page database program module 76 retrieves transactions and database information from the card key and system database program module 72 and permits transfer of data to remote computers in real time. The web page database program module 76 permits remote computers 44 to send updated database information within the card key and system database program modules 72.

The web page database program module 76 can display system status of both the input and output access control devices 46 and 48 in real time. Such display of system status can take the form of graphical images with dynamic status information on a video device of the remote computer 44. The web page database program module 76 supports JAVA APPLETS, JAVA Script and/or virtual basic VB Script to provide enhanced user interface from remote computers 44.

The mail client program module 80 generates E-mail to a user's or administrator's E-mail account. The term "client" is defined as a computer system or process that requests a service of another computer system or process (a "server"). The mail client program module typically employs simple mail transfer protocol (SMTP) which is used to transfer electronic mail between computers, usually over an Ethernet™. SMTP is a server-to-server protocol so other protocols are used to access the messages. SMTP dialog usually happens in the background under the control of a message transport system, e.g., send mail but it is possible to interact with a SMTP server using Telnet to connect to a normal SMTP port. The mail client program module 80 provides E-mails that include, but are not limited to, information which indicates system status, hourly/daily alarm reports, hourly/daily transaction reports, and daily time clocking transactions. The information generated by the mail client program module 80 can be programmed to be formatted as standard text E-mail or as a text file attachment in the E-mail.

The TCP/IP program module 82 is preferably TCP/IP stack. The TCP/IP program stack is a data structure for storing items which are to be accessed in last-in first-out order. The operations on a stack are to create a new stack, to "push" a new item on to the top of stack and to "pop" the top item off. By using TCP/IP communication protocol within the TCP/IP program module, different types of communication interfaces are available to connect the FEAC 20 to a remote computer 44. The TCP/IP program module 82 having a TCP/IP stack permits standard LAN connection for intranet accesses; standard LAN connection for internet accesses; and standard data transfer via modem with a serial RS-232 port with point-to-point protocol (PPP) for dial-in and-or dial-out internet accesses.

Figure 3:
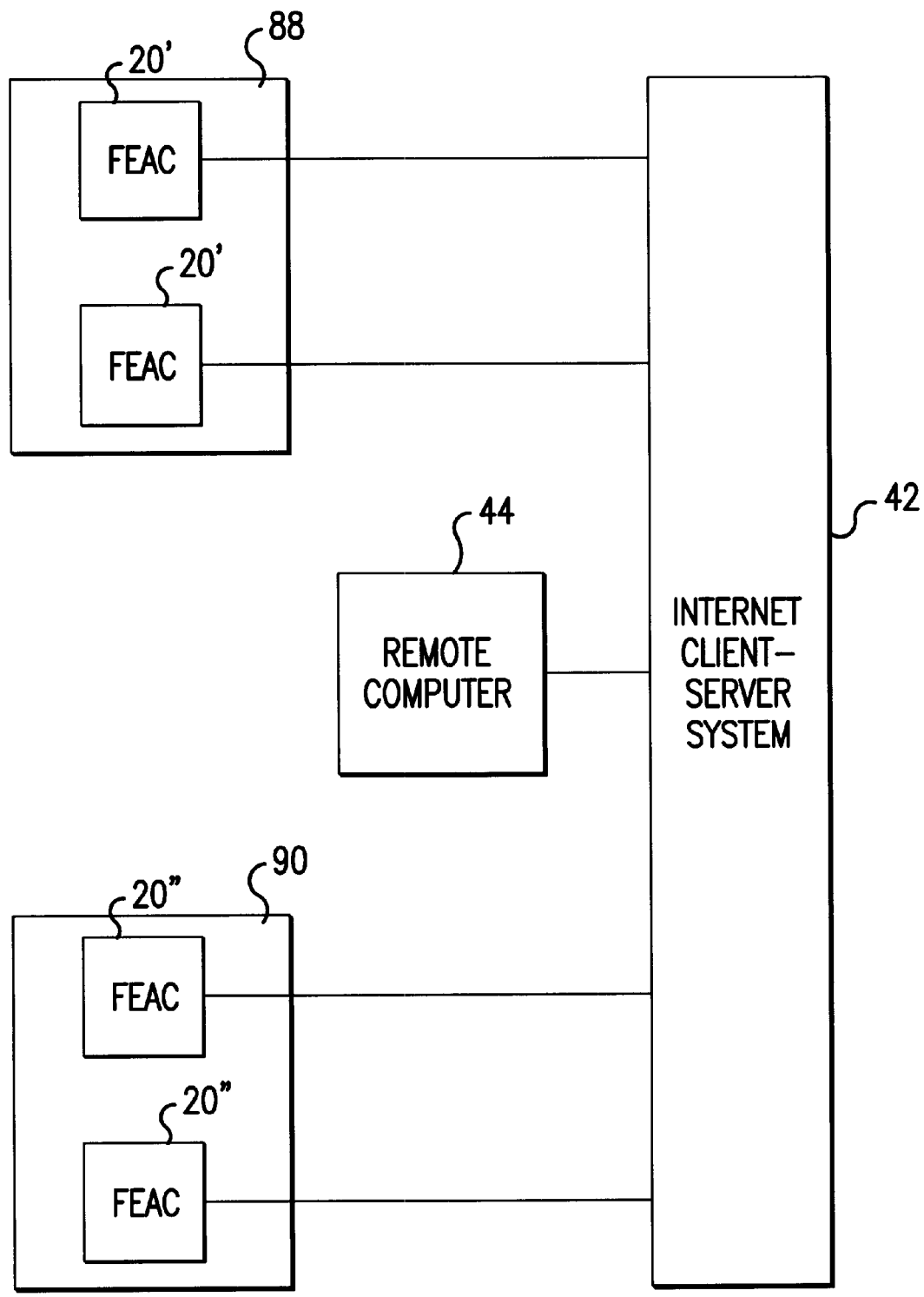
FIG. 3 illustrates a system of multiple facility electronic access controllers which are operatively linked with a cross-platform interface.

FIG. 3 shows a block diagram of a preferred embodiment of the present invention. In FIG. 3, multiple facility electronic access controllers (FEACs) 20 are shown to be operatively linked to an internet client service system 42. Preferably the internet client-server system is the world wide web or Internet. With the system of the present invention, a single remote computer can access multiple FEACs 20' and 20" from a single remote geographical location with a remote computer 44. The FEACs 20' and 20" may have operating systems which are compatible with each other. Such is the case with facilities or buildings which are spaced very close to each other in a geographical manner.

FEACs 20' form a subsystem 88 having a first type of operating system. FEACs 20" may also have similar operating systems relative to each other but which are different with respect to the operating systems of FEACs 201. Therefore, the operating systems of FEACs 20' and 20" may not be compatible with each other and therefore conventional operative links would not be possible.

With the present invention, when each of the FEACs 20' and 20" of the present invention include the system hardware 10 and software 66, cross-platform operation between the relatively different operating systems of FEACs 20' of subsystem 88 and operating systems of FEACs 20" of subsystem 90 is possible. This cross-platform remote control and monitoring can be performed by using a remote computer 44 operatively linked to the internet client-server system 42. In the alternative, it is possible to control and monitor the FEAC 20" of subsystem 90 from a FEAC 20' in subsystem 88 due to the cross-platform nature of the present invention which employs the internet client-server system 42.

In other words, any FEAC system can be controlled internally within a respective FEAC 20' or 20" itself or within another FEAC system 20' or 20" which is geographically outside of the FEAC 20' or 20" being monitored or controlled. Subsystem 88 of FEACs 20' and subsystem 90 of FEACs 20" would closely parallel two sets of buildings or facilities which are displaced significantly far away from each other and which may have not been equipped with the same operating systems. For example, subsystem 88 with FEACs 20' could be a university in one geographical location such as a country and subsystem 90 of FEACs 20" could be a university having buildings with FEACs 20" that are in a second country on an opposite side of the globe.

The applications of this invention are not limited to these examples and can include any other applications where cross-platform operation of different FEACs 20' or 20" are desired. It is further noted that it is also possible to simply have FEACs 20' and 20" with compatible operating systems which can use the internet client server system 42 in order to eliminate the need for providing separate cabling between subsystems 88 and subsystem 90 and the respective FEACs 20 or 20' within a respective subsystem.

Exemplary System Capabilities

The remote computer 44 via a web browser operates and monitors alarm monitoring conditions, alarm sensor status, operating parameters, and system database and transactions files. The remote computer 44 is able to monitor transactions or send remote commands or download parameter changes to selected FEACs.

Graphical maps showing the floor plans of a building or building grounds/compounds can show the location of alarm sensors on the computer screen of the remote computer 44. Each alarm sensor shall be tagged with an icon and description text.

For alarm monitoring, the operator at each remote computer 44 is able to view the status of alarm sensors, whether it is in normal or alarm state or even a line fault. The location of each sensor shall be represented with icon in the same graphical map. Each intrusion alarm shall be represented by a flashing icon and a beeping alarm tone.

Multiple web pages produced by the operating system 68 shall show current and historical data for different transaction activities in addition to graphical maps showing the location of an alarm sensor. It shall be possible to configure specific types of web pages for users with a predefined security clearance.

A specific type of web page having more or less data can be based on security password(s) and other types of log-in control. For example, certain remote computers 44 will have access to all FEAC functions, to allow transaction monitoring, database entry/editing/detection and software remote control functions. While, on the other hand, certain remote computers 44 with a lower security clearance may have access to only transaction and alarm monitoring functions, such as those type of functions typically utilized by guards.

All alarm monitored points shall be armed or disarmed locally by local arming/disarming input devices, or by automatic time zone controls or manually by the operator at the remote computer 44. The remote computer 44 shall, upon receipt of an alarm signal from an alarm controller, perform at least one of the following: display the full alarm description text on an alarm transaction view window, showing the exact location, time and date of occurrence of an incoming alarm point plus the map's name/location where the alarm point can be viewed; when the corresponding map is being activated, the corresponding symbol representing the particular sensing detector shall be shown with a flashing icon and an alarm tone; and a system alarm counter shall indicate the number of alarms in the queue if there are more than one alarm occurring at the same time; the system will sound a beeping audible tone within a remote computer's 44 SMCCS (PC speaker); log the alarm text description, the date and time of its occurrence; and generate a hard-copy printout of the alarm message on the printer of the remote computer 44.

The operator of a remote computer 44 can handle the alarm conditions in the following manner: as described earlier, upon occurrence of an alarm, the remote computer 44 shall display an icon on the map associated with the alarm; once the operator has been notified of this alarm, he/she will use the mouse to turn off the alarm by simply pointing and clicking at an icon on the remote computer 44 to first sound off the alarm; next, the operator simply points the mouse against the flashing alarm icon to bring up the instructions associated with this specific alarm in a dialog box; if the operator wishes to acknowledge that alarm, he/she shall click at the <Acknowledge> icon to confirm the acknowledgement; the remote computer 44 shall then log the operator's name, time and date of the acknowledgement in reference to that specific alarm point; and the remote computer 44 shall be capable of displaying multiple graphic maps web pages on the same computer screen in order to assist operators in locating alarm sensors locations visually and quickly.

The present invention provides a method and system that enables cross-platform remote control and monitoring of facility electronic access controllers. The invention also provides a method and system for implementing changes with respect to facility access data and control for multiple central computers of facility electronic access controllers which may or may not have similar operating systems.

The present invention provides a method and system for providing cross-platform remote control and monitoring of facility access controllers where the central computer of each facility electronic access controller includes a web server.

The method and system for providing cross-platform remote control and monitoring of facility electronic access controllers permit each central computer of a facility electronic access controller to communicate with clients via industrial protocol using transmission control protocol over internet protocol (TCP/IP) and hypertext transfer protocol (HTTP).

The method and system for providing cross-platform remote control and monitoring of facility electronic access controllers permit clients of the facility electronic access controllers to employ any web browser program to access the FEAC with remote computers or remote central computers of a FEAC. The system permits monitoring of transactions/activities of a restricted area from and within the web server and/or the FEAC. With the present invention, control can be achieved by a remote computer with a web browser program.

The present invention provides a method and system for providing cross-platform remote control and monitoring of facility intrusion alarm monitoring functions, whereby the same remote computer or computers acting as web clients can monitor alarms which detect facility or building penetration conditions via the internet.

The present invention provides a method and system for providing cross-platform remote control and monitoring of facility access controllers where different central computers of FEACs running on different operating systems but which are connected in the same network (whether within a local area network or wide area network) to communicate with different central computers of FEAC.

The invention also provides a method and system for providing cross-platform remote control and monitoring of facility electronic access controllers where web servers of facility electronic access controllers are designed using hypertext markup language (HTML) standards that support different languages.

The method and system provides cross-platform remote control and monitoring of facility electronic access controllers where central computers of a FEAC act as simple mail transfer protocol (SMTP) clients, allowing the central computer of a FEAC to send data, log, normal activity transactions, or security breach data, etc., to a remote user via the internet E-mail protocol. With such a method and system, specific or selected information can be transmitted by a computer of a FEAC based on program control. Further, with such a method and system, specific or selected access information or data can be sent to multiple users at multiple locations via an internet E-mail system.

The present invention provides a method and system for providing cross-platform remote control and monitoring of facility access controllers where central computers running on different operating systems of FEAC can retrieve/access information or data with standard E-mail software.

The invention also provides a method and system for providing cross-platform remote control and monitoring of facility electronic access controllers where installation of identical software at each central computer of each FEAC is substantially eliminated.

The present invention employs a method and system for providing cross-platform remote control and monitoring of facility electronic access controllers where access data of the monitoring of restricted areas is provided to a remote computer or a central computer of a FEAC in real time. Such access data of restricted areas includes, but is not limited to, displaying cardholder identified codes, results of biometric scans, device names, location descriptions, and system database and FEAC in real time. Other access data includes, but is not limited to, displaying graphical images and dynamic status information on web pages and retrieving such information with web browsers of a remote computer or a central computer of a FEAC.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for providing cross-platform remote control and monitoring of a plurality of facility electronic access controllers, the system comprising:

at least one facility electronic access controller of said plurality of the facility electronic access controllers being linked to an internet client-server system, said at least one facility electronic access controller including:
a CPU;
a non-volatile memory for storing an operating system and an application code for said facility electronic access controller;
at least one of a network port and a cross-platform port for supporting a transmission control protocol/internet protocol (TCP/IP) and hypertext transfer protocol (HTTP);
an input/output interface;
an input access control device operatively linked to said input/output interface, the input access control device generating identification data of a user;
a comparator for comparing identification data stored in said facility electronic access controller with the identification data of the user;
an output access control device operatively linked to said input/output interface, said output access control device actuatable to allow access to a facility area if the identification data stored in said facility electronic access controller matches the identification data of the user;

a cross-platform network including an internet client-server system or local area network (LAN), wherein the cross-platform network is operatively linked to said facility electronic access controller via said at least one network port or cross-platform port; and a remote computer operatively linked to said facility electronic access controller by said cross-platform network, whereby said cross-platform network enables remote operation of said facility electronic access controller irrespective of compatibility between an operating system of said remote computer and the operating system of said facility electronic access controller;

wherein said CPU sends identification data, time data and location data to said remote computer via the cross-platform network; and wherein the system allows a single change or multiple changes in at least one of the identification data, time data, location data and operating parameters to be implemented into the operating system of said remote computer and the operating system of said facility electronic access controller linked to the internet client-server system.

2. The system of claim 1, wherein said CPU generates page data of information available on the internet client-server system identified by a uniform resource locator.

3. The system of claim 1, wherein said CPU formats at least one of said identification data, time data, and location data into an electronic mail message using simple mail transfer protocol.

4. The system of claim 1, wherein said CPU runs a first operating system software and said remote computer runs a second operating system software, said first operating system software is different than said second operating system software.

5. The system of claim 1, wherein said CPU runs a controller operating system software, said controller operating system software includes an access control system program module, a TCP/IP program module and an internet server program module.

6. The system of claim 1, wherein said CPU runs a controller operating system software, said controller operating system software includes an access controller system program module, a TCP/IP program module, and a mail client program module.

7. The system of claim 1, wherein said input access control device includes at least one of a card key reader, a biometrics reader, and a keypad device.

8. The system of claim 1, wherein said input access control device includes a sensor.

9. The system of claim 1, wherein said output access control device includes at least one of an audio output device, a visual output device, and an actuator of a lock.

10. A method for providing cross-platform remote control and monitoring of at least one facility electronic access control of a plurality of facility electronic access controllers linked to an internet client-server system, the method comprising the steps of:

monitoring an input access control device with the at least one facility electronic access controller;

receiving first identification data with the facility electronic access controller from the input access control device;

comparing second identification data stored in the facility electronic access controller with said first identification data;

activating an output access control device of the facility electronic access controller if said first identification data matches said second identification data;

generating at least one of time data and location data with the facility electronic access controller in response to said first identification data;

transferring said first identification data, at least one of said time data and said location data with the facility electronic access controller over cross-platform network to a remote computer;

changing at least one of said identification data, said time data, said location data and operating parameters of the facility electronic access controller with the remote computer; and implementing changes in real time with respect to facility access data or control data for the remote computer and the at least one facility electronic access controller which may or may not have similar operating systems.

11. The method of claim 10, further comprising the step of storing said first identification data and at least one of said time data and said location data in a non-volatile memory of the facility electronic access controller.

12. The method of claim 10, further comprising the steps of:

accessing at least one of said first identification data, said second identification data, said time data, and said location data from the facility electronic access controller with the remote computer operatively linked to the controller via a cross-platform network.

13. The method of claim 10, further comprising the steps of:

displaying at least one of graphical data and text data corresponding to at least one of said first identification data, said second identification data, said time data, said location data, and operating parameters of the facility electronic access controller on a video device of the remote computer operatively linked to the controller via a cross-platform network.

14. The method of claim 10, further comprising the step of:

formatting at least one of said first identification data, said second identification data, said time data, and said location data into an electronic mail message using simple mail transfer protocol.

15. The method of claim 10, further comprising the step of:

generating a page of information available on the internet client-server system identified by a uniform resource locator.

16. The method of claim 10, further comprising the steps of:

operating the facility electronic access controller with a first operating system; and operating the remote computer with a second operating system, said second operating system being different than said first operating system.

17. The method of claim 10, wherein the step of receiving said first identification data further includes the step of reading a card key which is placed adjacent to a reader.

18. The method of claim 10, wherein the step of activating the output access control device includes the step of activating an actuator of a lock, and unlocking said lock to permit entry into a restricted area.

* * * * *